United States Patent [19]
Brisson

[11] Patent Number: 5,335,188
[45] Date of Patent: Aug. 2, 1994

[54] BICYCLE COMPUTER WITH MEMORY AND MEANS FOR COMPARING PRESENT AND PAST PERFORMANCE IN REAL TIME

[76] Inventor: Lawrence J. Brisson, 574 Croyden Ct., Sunnyvale, Calif. 94087

[21] Appl. No.: 104,442

[22] Filed: Aug. 10, 1993

[51] Int. Cl.$^5$ .................... G01P 11/00; G01P 3/64; G01C 22/00
[52] U.S. Cl. .................... 364/551.01; 364/561; 364/565; 364/569; 340/432; 482/8
[58] Field of Search .................... 364/424.01, 424.04, 364/433, 551.01, 561, 569, 565; 340/432; 368/111; 482/8, 9, 901, 902; 235/97

[56] References Cited

U.S. PATENT DOCUMENTS

| | | | |
|---|---|---|---|
| 4,071,892 | 1/1978 | Genzling | 364/424 |
| 4,323,237 | 4/1982 | Jungerwirth | 272/131 |
| 4,367,051 | 1/1983 | Inoue | 368/111 |
| 4,371,935 | 2/1983 | Yamaki | 364/424 |
| 4,633,216 | 12/1986 | Tsuyama | 340/134 |
| 4,636,769 | 1/1987 | Tsuyama | 340/134 |
| 4,638,448 | 1/1987 | Cuvelier et al. | 364/565 |
| 4,642,606 | 2/1987 | Tsuyama | 340/134 |
| 4,695,958 | 9/1987 | Mackenroth | 364/424 |
| 4,740,905 | 4/1988 | Murakami et al. | 364/571 |
| 4,779,865 | 10/1988 | Lieberman et al. | 272/129 |
| 4,817,940 | 4/1989 | Shaw et al. | 272/93 |
| 4,881,187 | 11/1989 | Read | 364/565 |
| 4,907,795 | 3/1990 | Shaw et al. | 272/93 |
| 4,919,418 | 4/1990 | Miller | 272/129 |
| 5,044,371 | 9/1991 | Lautenschläger | 128/707 |
| 5,051,935 | 9/1991 | Matty | 364/569 |

OTHER PUBLICATIONS

Catalog—Colorado Cyclist; Summer 1993; AVOCET Vertech; p. 22; 3970 E. Bijou Street, Colorado Springs, Col. 80909.

Catalog—Colorado Cyclist; Summer 1993; POLAR Vantage XL; p. 23; 3970 E. Bijou Street, Colorado Springs, Col. 80909.

Catalog—Bike Nashbar; Spring 1993; AVOCET Cyclometer 50; p. 78; 4111 Simon Road, Youngstown, Ohio 44512.

Catalog—Bike Nashbar; Spring 1993; VETTA Heart Rate Cycle Computer; p. 79; 4111 Simon Road, Youngstown, Ohio 44512.

*Primary Examiner*—Thomas G. Black
*Assistant Examiner*—Michael Zanelli
*Attorney, Agent, or Firm*—Matthew F. Jodziewicz

[57] ABSTRACT

A device for monitoring and comparing present, past and ideal performances on an exercise machine senses a preselected set of factors chosen to represent the present performance of the user on the machine. A Central Processing Unit operates under a predetermined set of user controlled instructions to store the set of performance data for each performance of the user in its memory unit, and compare the present set against a stored user selected set of performance data representing a selected performance. It generates an output display signal representative of a user selected comparison metric therebetween.

8 Claims, 5 Drawing Sheets

BICYCLE COMPUTER WITH MEMORY AND MEANS FOR COMPARING PRESENT AND PAST PERFORMANCE IN REAL TIME

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. General and Particular Scope of the Invention

The present invention relates to improved means for continuously providing information about athletic performance to a bicyclist during a bike ride, so that the cyclist may use this information to optimize his athletic performance. More particularly, the present invention provides means capable of retaining detailed information about a previous athletic performance in a memory device within a portable instrument and means for comparing in real time the previous performance with a new athletic performance (i.e. moment by moment while the new performance is in progress), and for displaying the comparative data to the athlete, for use in optimizing his current performance.

2. Known Prior Art

When an athlete, such as a bicyclist, is competing or training for athletic improvement, it is very difficult to achieve optimal results without some clear and objective metric of performance. Without such an objective metric, the athlete must rely on his subjective feeling of the level of effort he is expending. However, such feelings are very imprecise.

During a hard workout, the continuous feeling of fatigue may lead the athlete to believe he is performing at the intended level of effort, only to discover at the end of the workout that his actual performance was quite different from his desired goal.

One known method for providing objective measurements during an athletic performance, is to define a limited number of checkpoints along the route, and to keep track of how long it takes to reach those checkpoints by using a stopwatch.

With this approach, the athlete receives occasional feedback about how the current performance is going, but there are still problems. In practice this method is too crude and cumbersome to be useful in all but the simplest cases, as it is impractical to have a large number of these checkpoints, since the athlete must memorize them and the corresponding times.

Similarly, keeping track of the times at each checkpoint or even between performances, is difficult and error-prone, since the times keep changing as the athlete's performance improves. Furthermore, occasional checkpoints still do not give the athlete enough feedback for optimal guidance, since he must rely on the subjective feelings of exertion during the fairly long intervals between checkpoints as a gauge to his instantaneous performance.

At present, the best available solutions to these problems are embodied in portable devices known as CYCLE COMPUTERS. A cycle computer comprises a processor with an accurate clock, a sensor to measure the motion of a bicycle wheel, a display visible to the rider, and software to perform computations and display information.

Typically, such a cycle computer combines information about elapsed time with information about wheel motion, so as to compute and display elapsed time, distance traveled, average speed, and current speed. The most advanced cycle computers presently incorporate additional information relating to the rider's current performance, such as pedaling cadence and altitude. Some cycle computers also display symbols (such as + and −) to indicate whether the cyclist's current speed is above (+) or below (−) the average speed since the beginning of the present ride.

Existing cycle computers provide continuous information to the athlete about the current performance, the most important of which is speed. If the athlete is riding along a level route with road conditions suitable for constant speed, the existing cycle computer provides adequate information. All the athlete needs to know is the target speed for this workout, and he can observe at any moment whether he is performing at or above the target speed.

However, existing cycle computers do not provide adequate information for the vast majority of cycling routes, where road conditions vary significantly, and the route may pass over hills or even mountains. Along such routes, it is not possible to maintain a constant speed, and existing cycle computers do not present the right kind of information to allow the athlete to evaluate his performance continuously. With existing devices, the athlete must fall back to the old technique of memorizing the time it should take to reach certain checkpoints and evaluating his performance at those points.

SUMMARY AND OBJECTS OF THE INVENTION

It is an object of the present invention to provide the athlete with information that represents a practical standard of performance at each point along a course, and to display this standard to the athlete continuously in a form that makes it easy to compare his current performance with the standard.

Another object of the invention is to create this standard of performance in a way that guarantees it to be a practical and appropriate standard for the particular athlete, and a standard which takes into account the variations in the particular route.

Another object of the invention is to provide a plurality of such customized performance standards, with a different standard available for each training route used by the athlete.

An additional object of the invention is to provide means to change the standard for a route whenever the changing ability of the athlete warrants a new standard of performance for said route.

Another object of the invention is to provide means whereby the performance of one athlete may be recorded in the invention as a standard to be used by other athletes who wish to emulate the performance of the first athlete along the same training route.

Another object of the invention is to provide means to extract performance data from the cycle computer and transmit it to an external computer for processing and for safe-keeping. A related object of the invention is to provide means to transfer such data from an external computer into the cycle computer.

A particular embodiment of the invention consists of a cycle computer similar to those in the prior art, with the addition of a Random Access Memory (RAM) operatively connected to a processor, and suitable software to provide the functions of the invention. The RAM is connected to the processor with control and data paths so that the processor, under control of its software program, can read and write the cells of the RAM. The invention records the details of a current performance, moment by moment, in the RAM. Once the current performance is complete, the invention allows the athlete to preserve this record in a numbered area of the RAM. The invention provides a plurality of such numbered areas in order to preserve a plurality of such records. At the beginning of a new performance, the invention allows the athlete to select any of the previously saved sets of performance data for use as a standard of comparison, and displays said standard data along with current data so that the athlete can easily compare his current performance at any moment with similar data relating to said saved performance.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT OF THE INVENTION

With reference to the accompanying drawings, a preferred embodiment of the invention in a cycle computer will now be described. It would include an apparatus having a Random Access Memory (RAM) contained within the housing of the cycle computer, and suitable software to provide the functions of the invention. This RAM is connected to the processor with control and data paths so that the processor, under control of its software program, can read and write any cell of the RAM.

Figure 1:
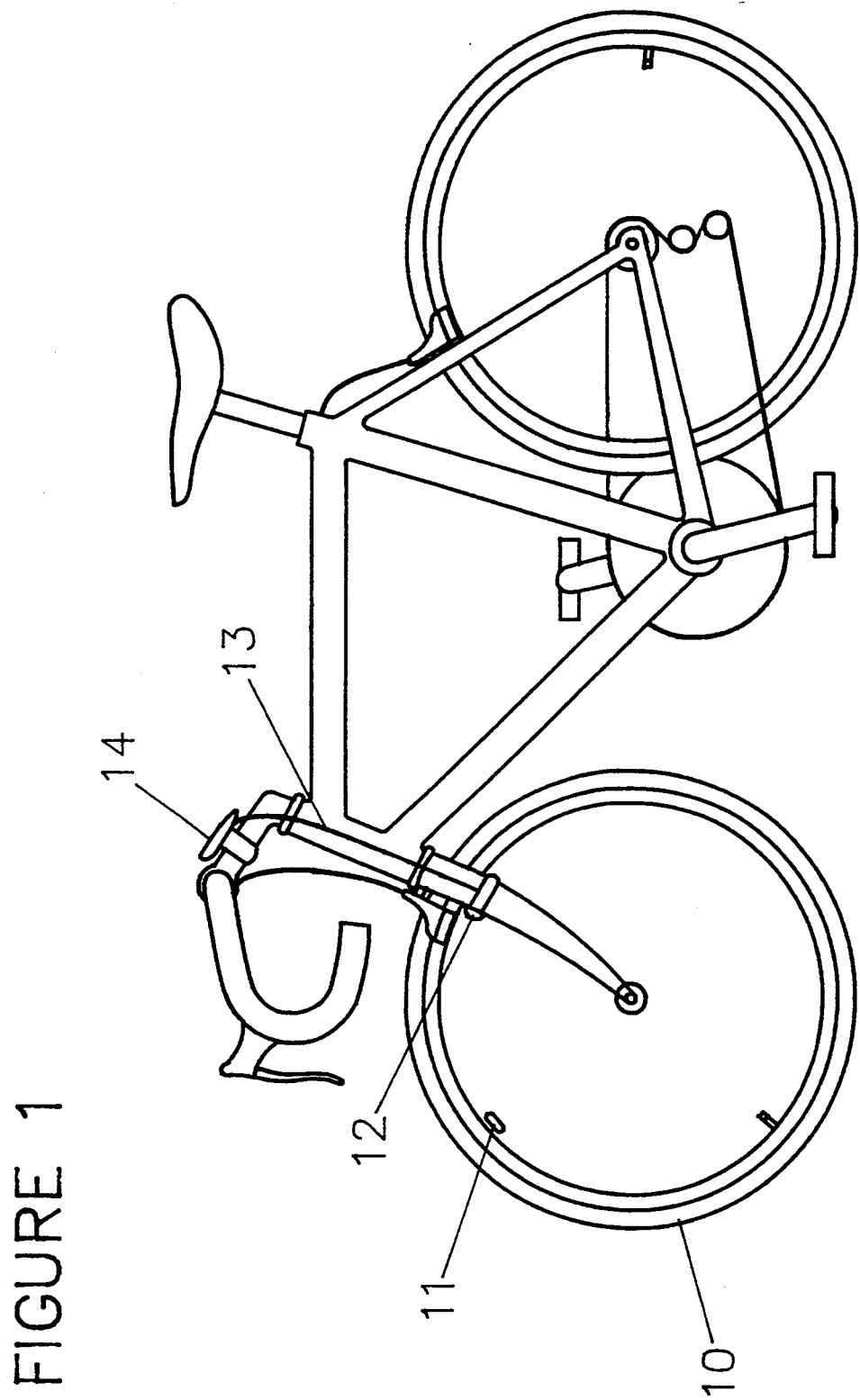
FIG. 1 is a diagram of bicycle with wheel motion sensor, wire, and cycle computer.

FIG. 1 shows the invention installed on a bicycle. A magnet 11 is attached to the wheel 10 so that magnet 11 passes in proximity to the motion sensor 12 during each rotation of the wheel. The motion sensor 12 sends a signal on the connecting wires 13 to the cycle computer 14 each time the magnet 11 passes. Other means may be used to provide the wheel motion information to the cycle computer, such as radio or infra-red transmission in place of a connecting wire.

The cycle computer 14 is attached to the bicycle in a location in which the bicyclist can operate its control buttons and view the display while riding.

The software in the invention records the details of the athlete's performance in a portion of the RAM while the ride is in progress. This recording begins when the timer is started, after having been reset to zero. Each RAM location within the operable RAM portion is written with numerical performance data pertaining to one point along the course of the ride, such as current elapsed time, current distance, current speed, and altitude. Such data is recorded at intervals whenever the timer is operating. The intervals between recording points may be of fixed or variable length. At the end of the current performance, the athlete may use the control buttons of the cycle computer, if desired, to save the recorded details of the current performance for future reference. In the process of saving the recorded data, the invention requires the athlete to choose an identifying number which determines what previously saved pace file will be replaced by the current ride's data. In the preferred embodiment, the invention also saves the current date along with the performance data as a means of helping the athlete to select and use the data in the future.

In general, whenever the stopwatch is started, the device records the details of the current performance (time versus distance and altitude, etc.) in a temporary area of memory. If the stopwatch is stopped, recording stops, but the record up to that point is retained. If timing is restarted, the record also restarts, creating new entries after the last. Only upon reset (which zeroes out the stopwatch and trip odometer) does the temporary historical record clear.

Figure 5:
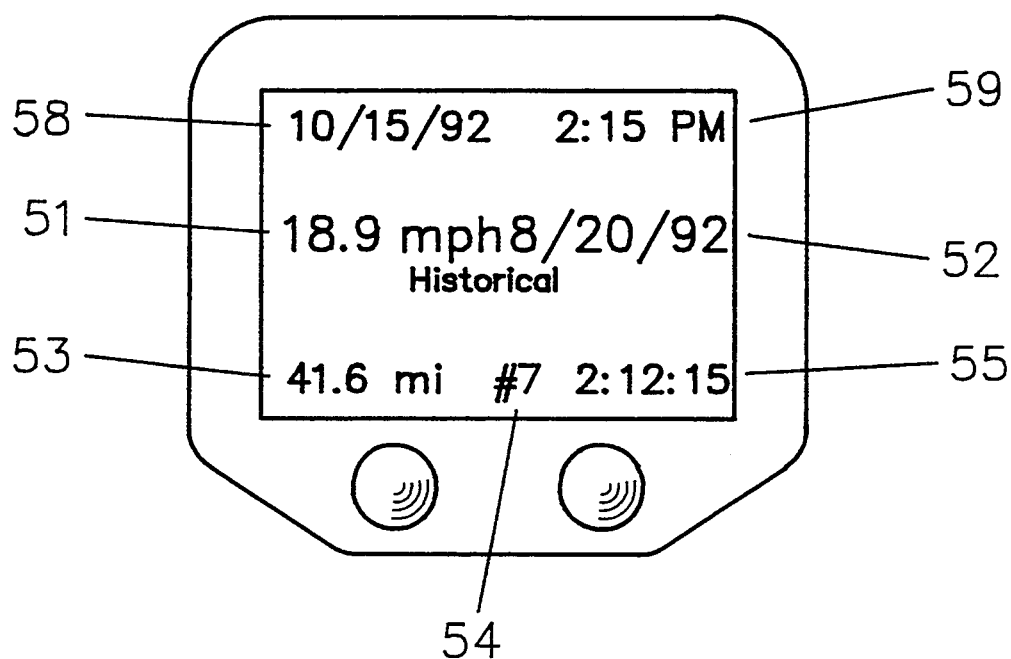
FIG. 5. illustrates a cycle computer display, showing current date and time; date, and memory number of pace data; also, total time, total distance and average speed of the pace ride.

Once the athlete has saved one or more sets of performance data, the invention allows the athlete to use the control buttons to select one of the saved sets of data to be used as a standard of performance for a subsequent performance. The display, as illustrated in FIG. 5, allows the athlete to view certain identifying information about the previously saved data as an aid in choosing a standard. In the preferred embodiment, the athlete can see on the display screen the identifying number of a set of saved data, the date it was saved, the total distance of the saved performance, its total elapsed time, and its overall average speed. The control buttons are used to view the identifying information for other sets of saved data, until the desired set is found. After viewing this identifying information, the athlete uses the control buttons to select the data to be used as a standard for the present ride.

The selection of a standard normally occurs at the start of a ride, but it is possible to change to a different standard during the ride, if desired. This capability is useful in case the user realizes after starting a ride that he has accidentally selected the wrong pace ride for comparison. If the user does switch to a different pace ride, the processor immediately scans the selected data to locate the points in time and distance that correspond to the point reached on the current ride. If the user has changed the standard while the timer is running, the processor might not be able to process the new pace file in time to update the display right away; if this happens, the comparison data from the pace ride should become blank temporarily on the display, until the processor catches up and can show correct data from the new pace file.

Once a standard has been selected, the athlete uses the control buttons to start timing the current ride. The invention then begins to display information from the selected standard ride in proximity with similar data relating to the current ride, so that the athlete can easily observe at any time how his current performance compares to the selected standard. The invention uses information about the current ride, such as distance travelled and elapsed time, to determine which portions of the saved standard data to display, so that the displayed standard data always corresponds to the point of the route where the athlete is presently located. Furthermore, when the athlete uses the control buttons to change the display to a different type of data, the invention also changes the display of standard data, so that the standard is always presented in a form similar to the data pertaining to the current ride, making it easy for the athlete to compare them. For example, if the cycle computer is displaying the rider's current instantaneous speed, the invention will also show the speed the rider was going at the same point on the selected pace ride. If the cycle computer is showing the elapsed time for the current ride, the invention also shows the amount of time that was required to reach the same point along the route during the selected pace ride. If the display shows the distance travelled on the current ride, the invention also displays the distance that was reached on the pace ride in the same amount of time as has been spent on the current ride.

At the end of each ride, the athlete always has the option of saving the data about the current performance. If he chooses to save the data, he also has the choice of which set number to use as an identifier. If he selects a set number which previously held saved data, the new performance data replaces the old data, which is then no longer accessible.

In the preferred embodiment, the invention also displays symbols such as +, −, or = to indicate whether the rider is, respectively, presently faster than, slower than, or equal to the performance of the pace ride. If the display currently shows more than one performance metric, such as current speed and elapsed time, each metric would also have a symbol nearby to show how that metric compares to the similar metric for the pace ride. For example, if the rider is currently riding faster than he was at this point on the pace ride, but previously was riding slower, so that his overall speed on this ride is slower than the pace, the display would show a + near his current speed, but a − near the elapsed time. This lets the rider see at a glance that he is behind the desired pace overall, but is now improving.

In the preferred embodiment, the invention also provides an audible tone that can warn the rider if he is behind or is falling behind the desired pace. This audible tone could be selected at the option of the user by pressing the control buttons. This audible tone would make it easier for the rider to maintain his desired pace without the need to look at the cycle computer display very often. Ideally, the tone would consist of a series of pulses or 'beeps' that would sound periodically whenever the rider is not meeting the goals set by the pace ride. For example, if the rider's current speed is below the pace speed for this part of the route, a single beep would sound at intervals of perhaps 5 or 10 seconds. If the rider's overall average speed is below the desired pace, there would be two beeps close together at each interval. If the rider is behind in both his current speed and his overall average speed, there would be three beeps at each interval. It will be understood that similar information may be conveyed by other combinations of audible tones.

FIGS. 2 through 5 show four different external views of the display screen which illustrate the presentation of information which includes information available in the prior art, along with information unique to the present invention. The bicyclist uses the control buttons to select which of these screen formats to display.

Figure 2:
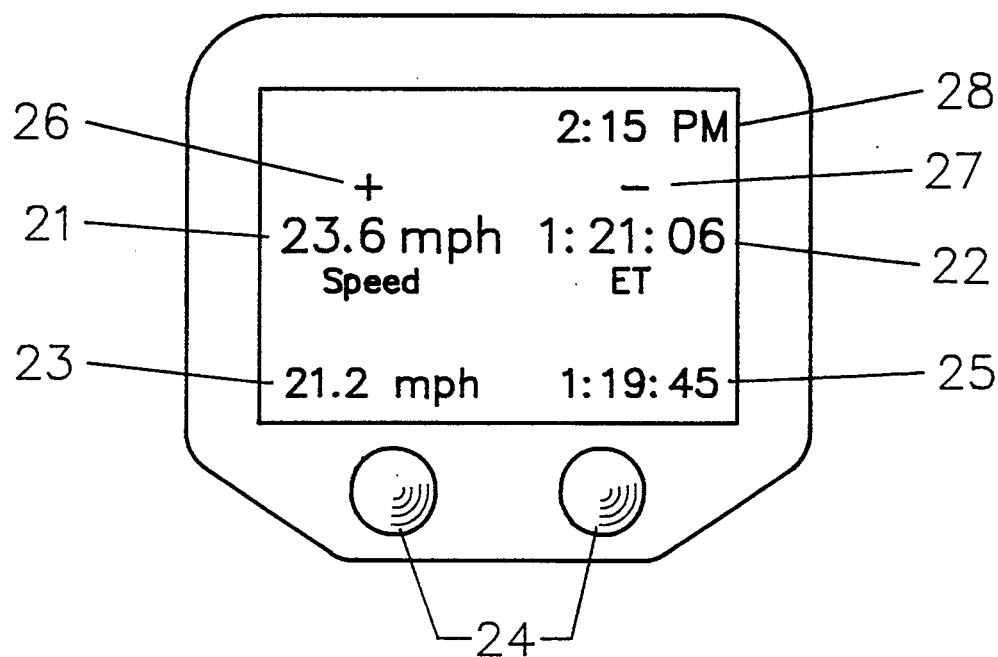
FIG. 2. illustrates a cycle computer display, showing current speed, elapsed time; pace speed and elapsed time.

In FIG. 2, the display shows the current speed 21 and the elapsed time 22 since the beginning of the current ride. The bicyclist uses the control buttons 24 to operate the cycle computer. The lower portion of the display shows information derived from a saved performance which is being used as a standard of comparison. Item 23 is the speed at which the bicyclist was traveling at the corresponding point on the selected standard ride. Item 25 is the elapsed time which was required to reach the corresponding point on the selected standard ride. Items 26 and 27 are symbols that indicate whether the athlete is currently ahead of (+), behind (−), or even with (=) the performance at the corresponding point of the selected standard ride. Item 28 is the current time of day. In the preferred embodiment, the display presents corresponding information about the current ride and the selected standard ride in proximity for easy comparison by the athlete. For example, items 21 and 23 represent corresponding speeds, and are located one directly above the other, while symbol 26 tells how the speeds compare. Similarly, items 22 and 25 represent corresponding times, and are also located one directly above the other, in proximity with their comparison symbol 27.

Figure 3:
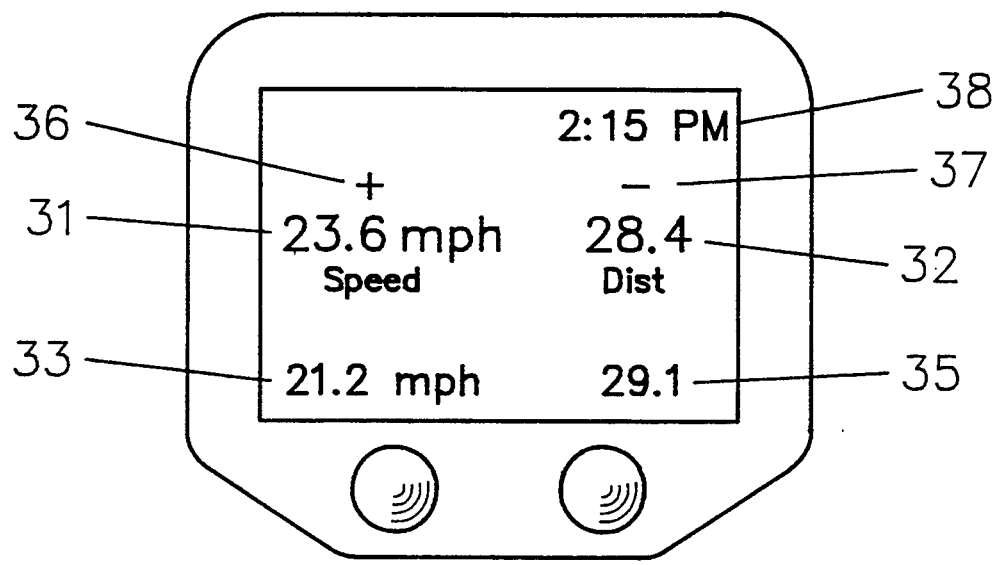
FIG. 3. illustrates a cycle computer display, showing current speed, distance; pace speed and distance.

In FIG. 3, the display shows the current speed 31 and the distance traveled 32 since the beginning of the current ride. The lower portion of the display shows information derived from a saved performance which is being used as a standard of comparison. Item 33 is the speed at which the bicyclist was traveling at the corresponding point on the selected standard ride. Item 35 is the distance traveled during same amount of time on the selected standard ride. Items 36 and 37 are symbols that indicate whether the athlete is currently ahead of (+), behind (−), or even with (=) the performance at the corresponding point of the selected standard ride. Item 38 is the current time of day. In the preferred embodiment, the display presents corresponding information about the current ride and the selected standard ride in proximity for easy comparison by the athlete. For example, items 31 and 33 represent corresponding speeds, and are located one directly above the other. Similarly, items 32 and 35 represent corresponding distances, and are also located one directly above the other.

Figure 4:
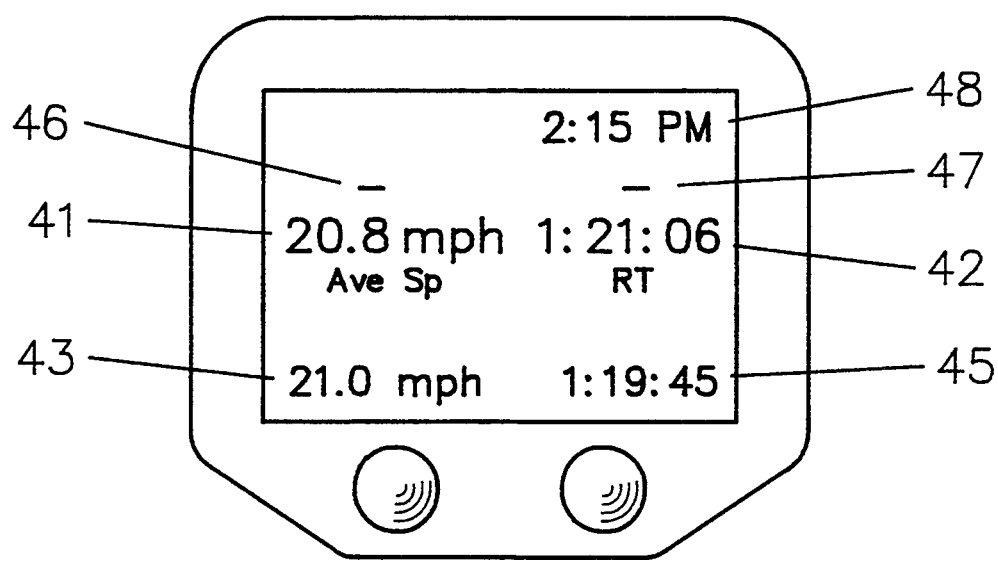
FIG. 4. illustrates a cycle computer display, showing average speed, riding time; pace average speed and riding time.

In FIG. 4, the display shows the average speed 41 and the riding time 42 since the beginning of the current ride. The lower portion of the display shows information derived from a saved performance which is being used as a standard of comparison. Item 43 is the average speed the bicyclist was traveling up to the corresponding point on the selected standard ride. Item 45 is the riding time required to reach the corresponding point on the selected standard ride. Items 46 and 47 are symbols that indicate whether the athlete is currently ahead of (+), behind (−), or even with (=) the performance at the corresponding point of the selected standard ride. In the preferred embodiment, the display presents corresponding information about the current ride and the selected standard ride in proximity for easy comparison by the athlete. For example, items 41 and 43 represent corresponding average speeds, and are located one directly above the other. Similarly, items 42 and 45 represent corresponding riding times, and are also located one directly above the other.

FIGS. 2 to 4 merely represent three possible means of presenting the data available from this invention, and it should be understood that many other presentations are possible and are within the scope of this invention. In particular, if the cycle computer measures other parameters besides time, speed, and distance, these other metrics may also be saved in the memory of this invention and displayed on suitable screens that compare these metrics on the current ride with similar metrics from a saved pace ride. For example, if pedaling cadence is measured, it may be saved in memory and displayed on a screen that compares current cadence with cadence at the same point of the pace ride. If altitude is measured, it may be saved in memory and displayed on a screen that compares the rate of ascent of the current ride with the rate of ascent at the same point of the pace ride. Similarly, the rider's heart rate may be saved and displayed for comparison. The invention also embodies having another screen which shows the total time that was required to complete the pace ride, and the estimated total time to complete the current ride, based on comparative performance up to the present point of the ride.

In FIG. 5, the display shows information that is useful for selecting among the saved sets of historical performance data. Such a selection is made at the beginning of a ride, to choose the standard for comparison during the ride, and also at the end of a ride, to choose which numbered area of memory to replace with information about the ride that was just finished, if the athlete chooses to save such information at all. Item 58 is the current date, and item 59 is the current time of day. Item 54 is the identifying number of one of the saved sets of historical data whose summary information is displayed in items 51, 52, 53, and 55. Item 51 is the average speed achieved over the entire course of the saved ride identified by item 54. Item 52 is the date on which the ride identified by item 54 was executed. Item 53 is the total distance traveled during the saved ride identified by item 54. Item 55 is the total time spent during the saved ride identified by item 54. By pressing the control buttons which are provided on the preferred embodiment of the invention in a cycle computer, the user may scroll through the different saved sets of performance data and observe the key parameters of each saved set on screens such as in FIG. 5. Using the displayed information, the user may select a specific set for use as a standard during the current ride by pressing the control buttons. Similarly, by pressing a different combination of buttons, the user may save the information about the current ride in one of the numbered areas of memory.

Figure 6:
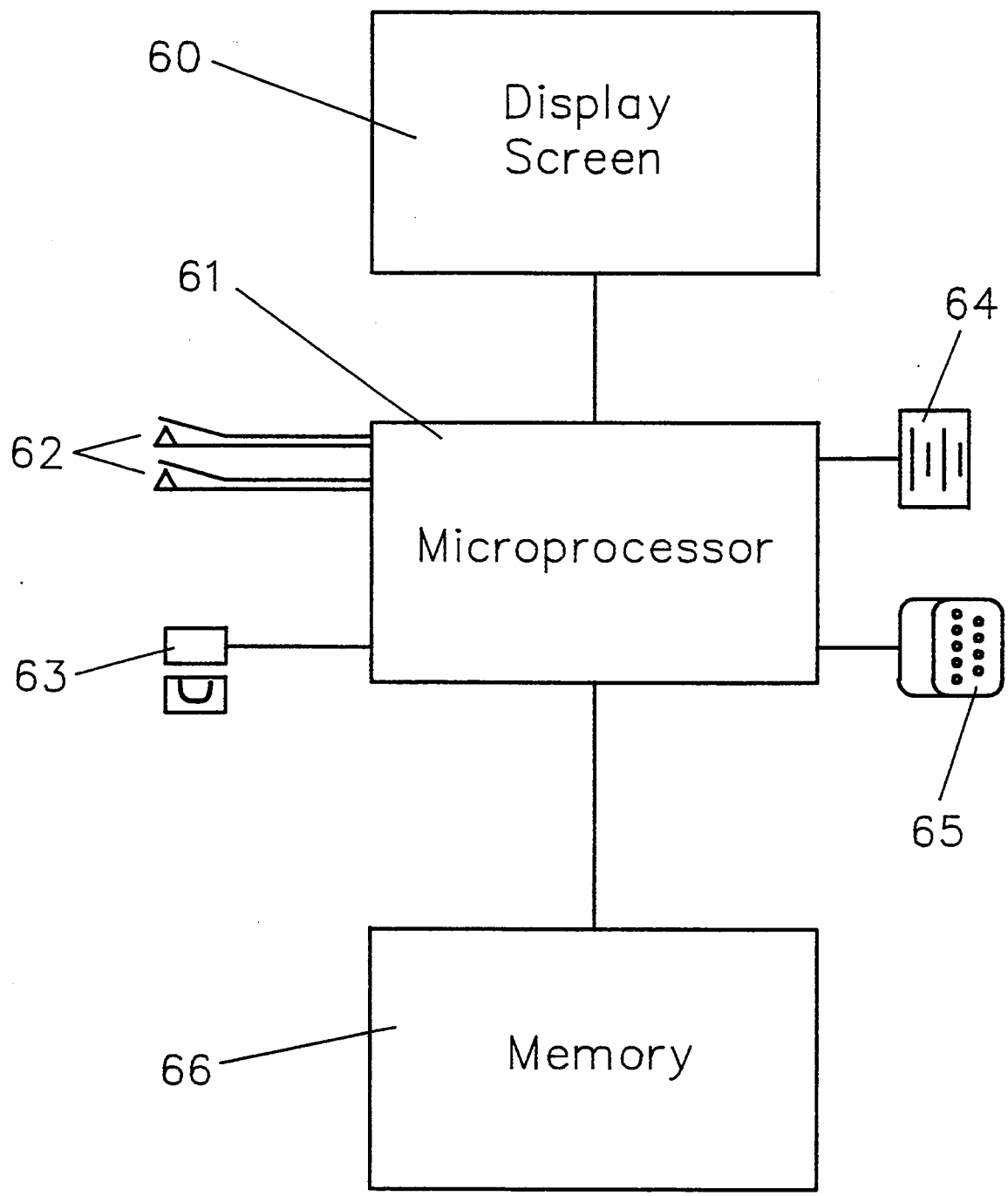
FIG. 6. is a block diagram of processor, display, batteries, buttons, memory and connector for linking to an external computer; and, FIG. 7 is a diagram of the two primary data arrays of the present invention as maintained in memory to keep track of pace data from previous rides.

FIG. 6 provides a block diagram of the preferred embodiment of the invention. Item 60 is the display, which may be a liquid crystal type or other suitable display. Item 61 is the central processor. Item 62 is the control switches. Item 63 is the wheel motion sensor. Item 64 is the battery or batteries that supply electrical power. Item 65 is a small external connector with which a cable may be connected to link the invention to an external computer, such as a Personal Computer. Item 66 is the memory which can contain the saved pace data from previous rides. In the preferred embodiment, this memory is constructed from a non-volatile Random Access Memory so its data is not lost when the battery loses power.

The connector 65 for linking to an external computer is an optional feature that would be present in the preferred embodiment, but is not required for the primary functions described above. If such connector is present, it may be used for several valuable functions. Data in the memory of the invention could be transmitted to the external computer for safekeeping, and transferred back to the cycle computer (or to another similar one) at a later time. This way, if the data in memory is ever lost due to a power failure, it can be reloaded from the external computer. Similarly, if the cycle computer is damaged, lost, or stolen, the user can restore his valuable data from the external computer to a new cycle computer.

If the user rides bicycles on many different routes, perhaps in different countries, the cycle computer itself might not have enough memory space to save all the pace rides the user would like. In such a case, the user could copy pace data to an external computer where an unlimited number of different pace files could exist. Then, whenever the user travels to a specific area or country, he could transfer into the cycle computer just the desired pace files for the routes in the area he will be riding.

Once the pace files have been transmitted to an external computer, they can be copied into any other cycle computer which embodies this invention. Hence, the data generated by one rider could be copied into the cycle computers of other riders to be used as a standard by them. In this way, one rider who is the best along a particular route could create pace data for other riders who are trying to improve their performance to match or exceed the first rider.

The data in the external computer can also be used to keep track of the progress of various riders. With appropriate software in the external computer, this performance data can be managed, plotted, and compared as part of a program of athletic training for an individual or a team.

With appropriate software, the external computer could also modify a pace file so as to create a different standard, which could then be loaded into the cycle computer. For example, an athlete might set a goal of improving his best time on a certain route by 5%. He could have the external computer modify the file of pace data so that all segments of the ride are faster by 5%, and then copy this modified pace file into the cycle computer.

Figure 7:
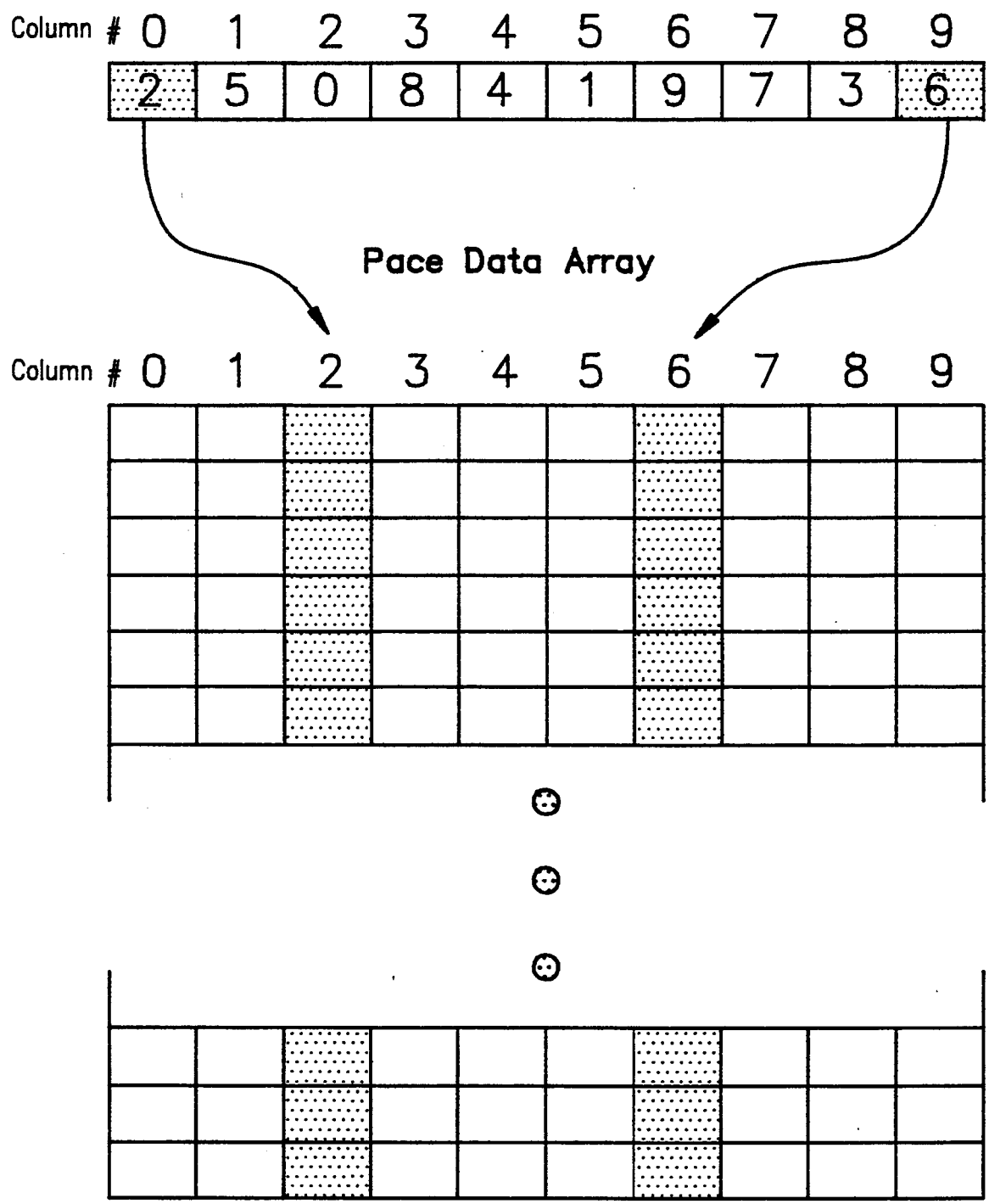

FIG. 7 illustrates how the primary data arrays are organized in memory to keep track of pace data from previous bike rides and to record pace data from the current ride. Pace ride data is kept in the two dimensional array labeled as the 'Pace Data Array' in FIG. 7. In this array, each column holds pace data for one ride. In the example shown, the array has 10 columns numbered from 0 to 9, which implies that this array can retain information about 10 different rides. Since there must always be a column available to record the current ride, one of these columns is used as temporary storage for the current ride, while the other nine columns retain pace data from nine previously saved rides. The number of columns provided in an instance of the invention depends on the size of the RAM used in that model, among other things.

The number of entries in a column determines how long a ride can be recorded. When a ride is being recorded, each time a certain interval passes, a new entry is written into the next unused location in the column for that ride. For example, if a particular model records data every 15 seconds, then a new entry is written in the proper column every 15 seconds until the ride is done (or, until the column is full). In order to allow a ride of up to 12 hours without overflowing the column, the RAM should be large enough so that each column has at least 2,880 entries, if entries are written every 15 seconds.

The entries written in each column may consist of a single data field or more than one field. One field is sufficient to provide the functions of the invention, allowing it to compute and compare distance, time, and speed at any point of a ride. However, if the cycle computer has access to other types of data, they can also be recorded as additional fields. For example, it is possible to record altitude, cadence, and heart rate along with distance and time, whenever an entry is added to a column. If such additional data is available, presumably the cycle computer would also provide additional display screens to show this data to the user, similar to those shown in FIGS. 2 to 4, but with different data being displayed. If such screens exist, in this invention, they would be augmented with fields that show similar data from the pace files, to compare with the current ride.

To avoid having to copy an entire column of the data array to another column when saving a new ride, the columns are managed by use of the Mapping Array. The Mapping Array has one entry for each column in the Pace Data Array. Entry 0 in the Mapping Array contains the column number of the Pace Data Array column that is to be used for recording the current ride. The other entries in the Mapping Array indicate the columns containing various previously saved rides. The index into the Mapping Array is the number that is associated with each saved pace file, and it is this index that is shown to the user as item 54 on the display as shown in FIG. 5. Using the Mapping Array, a newly completed ride can be saved in place of an old saved ride simply by swapping two values in the Mapping Array. For example, note the shaded columns in FIG. 7. Mapping array entry 0 points to column number 2, which is where data from the current ride is stored. Mapping array entry 9 is shaded because the user has selected saved ride number 9 for comparison, and this entry points to column 6 in the Pace Data Array. After the current ride is done, the user might decide to save the new ride's data in place of old ride number 9, perhaps because the new ride was faster. To save the new ride in this way, the invention merely swaps the values in Mapping Array entries 0 and 9. After doing so, entry 9 points to column 2 (which holds data for the ride just completed), and entry 0 points to column 6, which will be used to record the next ride.

THE ALGORITHMS AND THE C PROGRAM IMPLEMENTING THEM

The invention is implemented by a combination of hardware and controlling software. The hardware consists of the elements and structure shown in FIG. 6.

The software portion of the present invention includes software which provides at least the following functions: controlling the stopwatch timer, counting wheel rotations, computing distance and speed, displaying various information on the screen, and responding to the pressing of control buttons. The software of the present invention also contains the following novel and unique aspects:

1. It defines new variables and data arrays needed for the invention, and initializes them properly.
2. Each screen showing current performance data is changed to display also the corresponding values computed from the selected pace file. Examples of these screens are shown in FIGS. 2, 3, and 4.
3. An additional screen is added, similar to that shown in FIG. 5, to display summary information from the saved pace files so the user can choose one. While this screen is displayed, pressing one of the control buttons causes the display to show data from the next pace file in round-robin sequence.
4. During a ride, while the timer is operating, two new functions are to be performed whenever the display is updated (usually once per second):
   4.1 Save the data about the current ride (e.g. time and distance) in the next location of a temporary array of memory if enough time has passed since the last time an entry was made in this temporary array.
   4.2 Find the portions of the selected pace file in memory that corresponds to the current point of the route and compute values to display.
5. After a ride, when the stopwatch has been stopped, if the user changes the screen display to the new one (mentioned in item 3 above and shown in FIG. 5) and presses a preset combination of control buttons, the data from the current ride replaces the previously saved data in the area of memory presently displayed.

The details of the logic for these functions have been implemented and are shown in a set of programs in the APPENDIX, written in the C programming language, and including many comments. Each of these 5 novel items listed above is explained further below, with reference to the C program appearing in the Appendix. The subroutines in the appendix are written with the understanding that there is a 'main program' in the cycle computer that performs all the functions of prior art cycle computers, and which calls the subroutines in the appendix to perform the new operations required by the present invention, as itemized in the above list of 5 unique and novel items.

Item 1 is implemented by the data declarations under the heading 'Global Data' and by the subroutine named 'start_ride' which initializes the global data properly for use during each ride. The global data areas contain data that is needed in various subroutines, and is defined globally so it can be easily used in all routines that need it. The comments in the C program declarations explain the uses of each variable.

Item 2 is implemented by the function 'update_screen' in the appendix. This function is called to display information from the current ride with comparable information from the selected pace file. There are three screen formats defined, and the input argument screen_type selects which format is to be displayed. All the screens show the current date and time, and the symbols (+, −, or =) that indicate how the current ride compares to the pace. In addition, the other data shown for each type is as follows:

1. Current speed, current elapsed time, pace current speed and time; as shown in FIG. 2.
2. Current speed and distance, pace current speed and distance; as shown in FIG. 3.
3. Average speed and riding time of this ride, and pace average speed and riding time to the same point of the route; as shown in FIG. 4.

Item 3 is implemented by the functions 'show_pace_files' and 'advance_index' in the appendix. Function 'show_pace_files' displays summary information about one pace file at a time in a format as shown in FIG. 5. This data gives the user enough information to select the pace file appropriate for comparison during the planned ride. While this screen is being displayed, if the user presses the appropriate control button, the function 'advance_index' is called to change the selected pace file to the next one in round-robin sequence. Then 'show_pace_files' is called again to display the information from that file. If that file number has no valid data, the missing fields are displayed as blank.

Item 4 is implemented by subroutine 'evaluate' in the appendix, which performs both functions 4.1 and 4.2. The main program calls 'evaluate' each time the display is to be updated. The main program keeps track of basic data about the current ride, such as elapsed time and distance travelled, in global variables which are used by this subroutine.

The 'evaluate' program has two functions. 1. It periodically creates another entry in the current temporary pace file to keep track of the progress of the current ride in case the user later elects to save it permanently. 2. It scans through the selected pace file (if any) to find the places that correspond to the same distance and time in the pace ride, and uses that data to compute comparable values that may be displayed along with the usual information about the current ride so the user can easily see how he is doing compared to the chosen pace ride. The logic of the 'evaluate' program is discussed below in more detail.

Item 5 is implemented by function 'save_ride' in the appendix. This function is invoked if the user presses a certain combination of control buttons while the screen shown in FIG. 5 is being displayed. For example, one implementation could require the user to press two buttons simultaneously to replace the pace file currently shown on the screen with the data from the ride that has just been completed. Since the areas of pace data are mapped by the mapping array, as shown in FIG. 7, it is very easy and fast to make this replacement. There is no need to move all the actual data in the array; all that is needed is to swap pointer values in the mapping array. Before doing that, this routine checks to make sure the current ride was of non-zero duration, to avoid destroying good saved data with a null ride that is of no use.

LOGIC OF THE 'EVALUATE' PROGRAM

The 'evaluate' program uses a two-dimensional array to keep track of data for all the pace files in the invention, including one that is used as a temporary file for saving data about the current ride in progress. There are several ways that the necessary data may be represented in such an array, all of which are within the scope of this invention.

Fundamentally, the data saved for each pace file consists of a set of entries that represent the distance travelled, and the elapsed time, from the start to various points of the route. If the cycle computer also measures other parameters, such as altitude, pedaling cadence, or heart rate, this other data can also be recorded along with the corresponding elapsed time and distance. There are various ways this fundamental data can be represented, which are logically equivalent.

For example, each element of the array could have two fields, one which indicates the elapsed time, and another to retain the corresponding distance from the start. In this case, the times and distances are cumulative, which implies that the values can become quite large during a long ride. If this data representation is used, the amount of memory in the invention must be enough to represent times and distances for long rides. The memory can be made smaller if each entry only holds the increment of time or distance since the previous entry. Since the entries are made quite often, such as once every 15 seconds (for example), the entries for time and distance can never be very large, and a minimum of memory space is required. With this design, the processor must accumulate the time and distance entries to determine the total elapsed time and distance from the start.

If the invention is designed to save data in memory at fixed intervals, then the array entries only need to store one of the two fundamental data types, since the other can be deduced from the entry location. For example, if a new entry is written exactly every 15 seconds, the entry only contains a distance value, since the time of an entry can be computed as the array location multiplied by 15 seconds. Similarly, if a new entry is written every time a certain distance is travelled, the entry only needs to contain the time value.

The specific implementation illustrated in the C program in the appendix is one in which an array entry is written at fixed time intervals, so only the distance is written in an array named 'dist'. Each distance is represented as the additional distance travelled since the last entry, and is recorded in units of the number of wheel revolutions. The time interval between entries is fixed for any particular pace file, but the program allows this interval to be different for different pace files. This flexibility is useful in case the cycle computer allows the user to set this time interval manually, or in case a pace file is copied from a different cycle computer that uses a different time interval. The 'evaluate' program has logic to write entries for the current ride following the comment lines containing '-- Item 4.1 --' and '-- Update Current Pace Array --'.

Since the pace data is only written at discrete intervals, the 'evaluate' program uses linear interpolation to approximate values for points along the route that lie between the entries. For example, if a first pace array entry indicates that 2.00 miles were travelled in 6 minutes and 0 seconds, and the next entry indicates that 2.08 miles were travelled in 6 minutes and 15 seconds, the program would conclude that 2.04 miles were travelled in 6 minutes and 7.5 seconds. Interpolation allows the program to compute very accurate data for comparison with the performance of the current ride at any point along the route, not only at the precise points where data was saved in the pace file. As a result, the invention can display useful comparison data at any moment.

The functions described above as item 4.2 determine which entries in an existing pace file correspond to the time and distance at the current point of the current ride. It is necessary to perform this process separately for time and distance, because time and distance will yield different comparisons any time the average speed on the current ride differs from the average speed at this point on the pace ride. The following table will serve to illustrate the two means of comparison. In this table, the array location represents the location of each entry in the pace array that is being used for comparison. The Elapsed Time is computed from the array location by multiplying by 15 seconds, since this example assumes entries were made in the pace file each 15 seconds. The portion shown in this sample table corresponds to the portion of the pace ride between 22 and 25 minutes from the start. The Distance column shows the total distance in miles from the start of the pace ride. This distance value is obtained by accumulating the distance entries in the array, since the array entries only hold incremental values.

| | Pace Ride | | Current Ride |
|---|---|---|---|
| Array Location | Elapsed Time | Distance (Miles) | Currently, 6.10 miles in 22:40 |
| 88 | 22:00 | 5.40 | |
| 89 | 22:15 | 5.49 | |
| 90 | 22:30 | 5.58 | 22:40 |
| 91 | 22:45 | 5 67 | |
| 92 | 23:00 | 5.75 | |
| 93 | 23:15 | 5.86 | |
| 94 | 23:30 | 5 96 | |
| 95 | 23:45 | 6.05 | 6.10 miles |
| 96 | 24:00 | 6.15 | |
| 97 | 24:15 | 6.24 | |
| 98 | 24:30 | 6.33 | |
| 99 | 24:45 | 6.43 | |
| 100 | 25:00 | 6.52 | |

As shown on the right side of the table, in this example it is assumed that the rider has travelled 6.10 miles in 22 minutes and 40 seconds on the current ride. We can compare the current ride with the pace ride in two ways.

To compare based on distance, the invention finds the entries for the pace ride that show how much time it took to travel 6.10 miles. There is no pace entry for exactly that distance, but there are entries for 6.05 and 6.15 miles, and interpolation indicates that 6.10 miles were reached at about time 23:52 on the pace ride. Hence, the current ride has required less time to cover the same distance at this point of the ride. This computation allows the invention to display a screen such as in FIG. 2 which includes the elapsed times. On such a display, using the numbers in this example, the display would indicate the current elapsed time as 22:40, and the pace elapsed time as 23:52, and the comparison symbol '+' would be displayed to indicate that the current ride is faster than the pace ride. In the 'evaluate' program in the appendix, the logic for comparing in this way, based on distance, is found following the comments '-- Item 4.2 --' and '-- Compare Based on Distance --'.

To compare based on time, the invention finds the entries for the pace ride that show how far the pace ride went in a time of 22:40. There is no pace entry for exactly that time, but there are entries for 22:30 and 22:45, and interpolation indicates that about 5.64 miles were reached at time 22:40 on the pace ride. This computation allows the invention to display a screen such as in FIG. 3 which includes the distances travelled. On such a display, using the numbers in this example, the display would indicate the current distance as 6.10 miles, and the pace distance as 5.64 miles, and the comparison symbol '+' would be displayed to indicate that the current ride is faster than the pace ride. In the 'evaluate' program in the appendix, the logic for comparing in this way, based on time, is found following the comments '-- Item 4.2 --' and '-- Compare Based on Time --'.

In summary, to display the current elapsed time versus the pace elapsed time, it is necessary to find the point in the pace array corresponding to the same DISTANCE. To display the current distance travelled versus the distance reached on the pace ride, it is necessary to find the point in the pace array corresponding to the same elapsed TIME.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

I claim:

1. A user controlled display system for a bicycle for monitoring and comparing electrical signals representative of the present performance of a rider along a course travelled, against a selected prior performance, comprising:

wheel revolution detection means associated with a wheel of the bicycle, said wheel revolution detection means providing a series of signals according to the number of revolutions of the wheel representative of the distance travelled by the wheel;

clocking means providing a plurality of timing signals representative of the elapsed time from the beginning of the performance;

Input/Output means for receiving user input and selection data, and generating a corresponding input signal representative thereof, and for generating a display signal in response to a received output display signal to display data to the user;

Central Processing Unit means receiving as input said distance travelled, elapsed time and user generated input signals, for retrievably storing each of said distance travelled, elapsed time and user generated input signals in a user selected portion of a memory means as a set of detailed performance data signals representative of at least the elapsed time and distance for a plurality of points along the present course travelled by the user, said central processing unit means operating under a predetermined set of user controlled instructions to store said set of performance data for each performance of the rider in said memory means, and compare said set of performance data signals against a stored user selected set of performance data representing a selected performance, and generate an output display signal representative of a user selected comparison metric therebetween to said Input/Output means.

2. The display system as in claim 1 further including:

sensor means associated with the bicycle for providing a series of signals according to the altitude of the bicycle and representative of the altitude;

means for providing said altitude signals to said central processing unit means.

3. The display system as in claim 1 wherein said central processing unit means further includes:

means to compare current performance data with user selected data so as to determine whether the present performance is faster or slower than the selected data and to generate an output display signal representative of the result of such comparison to the Input/Output means for display to the user.

4. The display system as in claim 1 wherein said Input/Output means further includes:

means for producing an audible tone operative in accord with said output display signal generated by said central processing unit.

5. The display system as in claim 1 wherein said Input/Output means further includes:

means for connecting said central processing unit means and memory means to an external computer system, so that said external computer system may read and write data into the areas of memory used by said central processing unit means.

6. A user controlled display system for an exercise machine for monitoring and comparing electrical signals representative of the present performance of a user of the machine, against a selected prior performance, comprising:

sensing means associated with the machine and adapted for providing a series of signals representative of a preselected set of factors chosen to represent the present performance of the user on the machine;

clocking means providing a plurality of timing signals representative of the elapsed time from the beginning of the performance;

Input/Output means for receiving user input and selection data, and generating a corresponding input signal representative thereof, and for generating a display signal in response to a received output display signal to display data to the user;

Central Processing Unit means receiving as input said series of signals representative of a preselected set of factors chosen to represent the present performance of the user on the machine, elapsed time and user generated input signals, for retrievably storing each of said distance travelled, elapsed time and user generated input signals in a user selected portion of a memory means as a set of detailed performance data signals representative of at least the elapsed time and each of the preselected set of factors chosen to represent the present performance of the user on the machine, for a plurality of points during the present performance of the user, said central processing unit means operating under a predetermined set of user controlled instructions to store said set of performance data for each performance of the user in said memory means, and compare said set of performance data signals against a stored user selected set of performance data representing a selected performance, and generate an output display signal representative of a user selected comparison metric therebetween to said Input/Output means.

7. The display system as in claim 6 wherein said Input/Output means further includes:

means for producing an audible tone operative in accord with said output display signal generated by said central processing unit.

8. The display system as in claim 6 wherein said Input/Output means further includes:

means for connecting said central processing unit means and memory means to an external computer system, so that said external computer system may read and write data into the areas of memory used by said central processing unit means.

* * * * *